(12) United States Patent  
Venkataswami et al.

(10) Patent No.: US 9,049,031 B2  
(45) Date of Patent: Jun. 2, 2015

(54) SYSTEMS AND METHODS FOR POINT TO MULTIPOINT COMMUNICATION IN NETWORKS USING HYBRID NETWORK DEVICES

(71) Applicant: Dell Products L.P., Round Rock, TX (US)

(72) Inventors: Balaji Venkat Venkataswami, Tamilnadu (IN); Bhargav Bhikkaji, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 13/801,708

(22) Filed: Mar. 13, 2013

(65) Prior Publication Data

US 2014/0269328 A1  Sep. 18, 2014

(51) Int. Cl.
*H04L 12/18* (2006.01)
*H04L 12/26* (2006.01)
*H04L 12/753* (2013.01)
*H04L 12/761* (2013.01)
*H04L 12/24* (2006.01)
*H04L 12/723* (2013.01)
*H04L 12/931* (2013.01)

(52) U.S. Cl.
CPC .............. *H04L 12/18* (2013.01); *H04L 41/12* (2013.01); *H04L 45/507* (2013.01); *H04L 45/48* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 6,778,531 B1* | 8/2004 | Kodialam et al. | 370/390 |
| 7,760,659 B2* | 7/2010 | Luo et al. | 370/252 |
| 8,077,615 B2* | 12/2011 | Foti | 370/230.1 |
| 8,310,957 B1* | 11/2012 | Rekhter | 370/256 |
| 8,422,403 B2* | 4/2013 | Wu et al. | 370/256 |
| 8,605,722 B1* | 12/2013 | Sindhu et al. | 370/390 |
| 8,699,486 B1* | 4/2014 | Luo et al. | 370/390 |
| 2006/0159092 A1* | 7/2006 | Boers et al. | 370/390 |
| 2007/0127477 A1* | 6/2007 | Peng et al. | 370/390 |
| 2007/0177739 A1* | 8/2007 | Ganguly et al. | 380/277 |
| 2013/0114595 A1* | 5/2013 | Mack-Crane et al. | 370/390 |
| 2014/0029410 A1* | 1/2014 | Kannan | 370/218 |

OTHER PUBLICATIONS

Shankar Raman et al., "Constructing power optimal P2MP TE-LSPs within an AS draft-mjsraman-pce-power-replic-00," Internet-Draft Memo dated Feb. 29, 2012, 12 pages.

* cited by examiner

*Primary Examiner* — Candal Elpenord
(74) *Attorney, Agent, or Firm* — Haynes and Boone, LLP

(57) ABSTRACT

An information handling system is provided. The information handling system includes an ingress network device receiving a multicast stream from a coupled source device and a first and a second egress network device. The first and second egress network devices each receive the multicast stream for coupled destination devices. The information handling system also includes a plurality of intermediate network devices by which the ingress network device is coupled to the first and second egress network devices to form a network and further includes a network controller. The network controller has a topology of the network in a memory and forms a multicast tree based on the topology as well as a link load level and a multicast replication capacity associated with links to the first and second egress network devices and to each of the plurality of intermediate network devices.

12 Claims, 5 Drawing Sheets

SYSTEMS AND METHODS FOR POINT TO MULTIPOINT COMMUNICATION IN NETWORKS USING HYBRID NETWORK DEVICES

BACKGROUND

1. Technical Field

The present disclosure is related to information handling systems. In particular, embodiments disclosed herein are related to information handling systems having a number of multicast streams traversing them.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the use of technology and information handling needs has increased in complexity and speed, the volume of data being transmitted has also increased. The number of components in an information handling system, such as a data center, has also increased. With the increasing complexity of the information handling system has come increasing difficulty in administering such systems. Various protocols have been developed and spread in effort to simplify and facilitate information handling system deploys. However, existing information handling system configurations have not been entirely satisfactory.

SUMMARY

Consistent with some embodiments, a network device is provided herein. The network device includes one or more processors with a network agent running thereon, a plurality of interfaces in communication with the one or more processors, and a memory. The memory stores instructions that, when executed by the one or more processors, cause the switch to perform a method including a number of steps. The steps of the method include sending a multicast replication capacity value to a network controller and receiving labels from the network controller. The labels correspond to a label-switched multicast tree. The method also includes steps of directing packets according to the label-switched multicast tree when sending packets on the plurality of interfaces and of replicating a multicast stream for transmission on at least two of the plurality of interfaces when the network device is designated as a replication point in the label-switched multicast tree.

Consistent with some embodiments, there is provided an information handling system. The information handling system includes an ingress network device receiving a multicast stream from a coupled source device and a first egress network device and a second egress network device. The first and second egress network devices each receiving the multicast stream for coupled destination devices. The information handling system further includes a plurality of intermediate network devices by which the ingress network device is coupled to the first and second egress network devices to form a network. A network controller that has a topology of the network in a memory and that forms a multicast tree based on the topology of the network is also included in the information handling system. The multicast tree is also based on a link load level and a multicast replication capacity associated with links to the first and second egress network devices and to each of the plurality of intermediate network devices.

Consistent with some embodiments, there is provided a method for forming a multicast tree for delivering a multicast stream from an ingress network device to a plurality of egress network devices in a network having a plurality of links. The method includes steps of forming a topology of the network on a network controller, determining a link load level and a multicast replication capacity associated with each of the plurality of links, and forming the multicast tree using the topology of the network and the link load level and the multicast replication capacity associated with each of the plurality of links. The method further includes steps of generating labels on the network controller, the labels being associated with the multicast tree, and sending the labels to a network agent running on the ingress network device and to each of a set of network devices that make up the multicast tree.

These and other embodiments will be described in further detail below with respect to the following figures.

Figure 1:
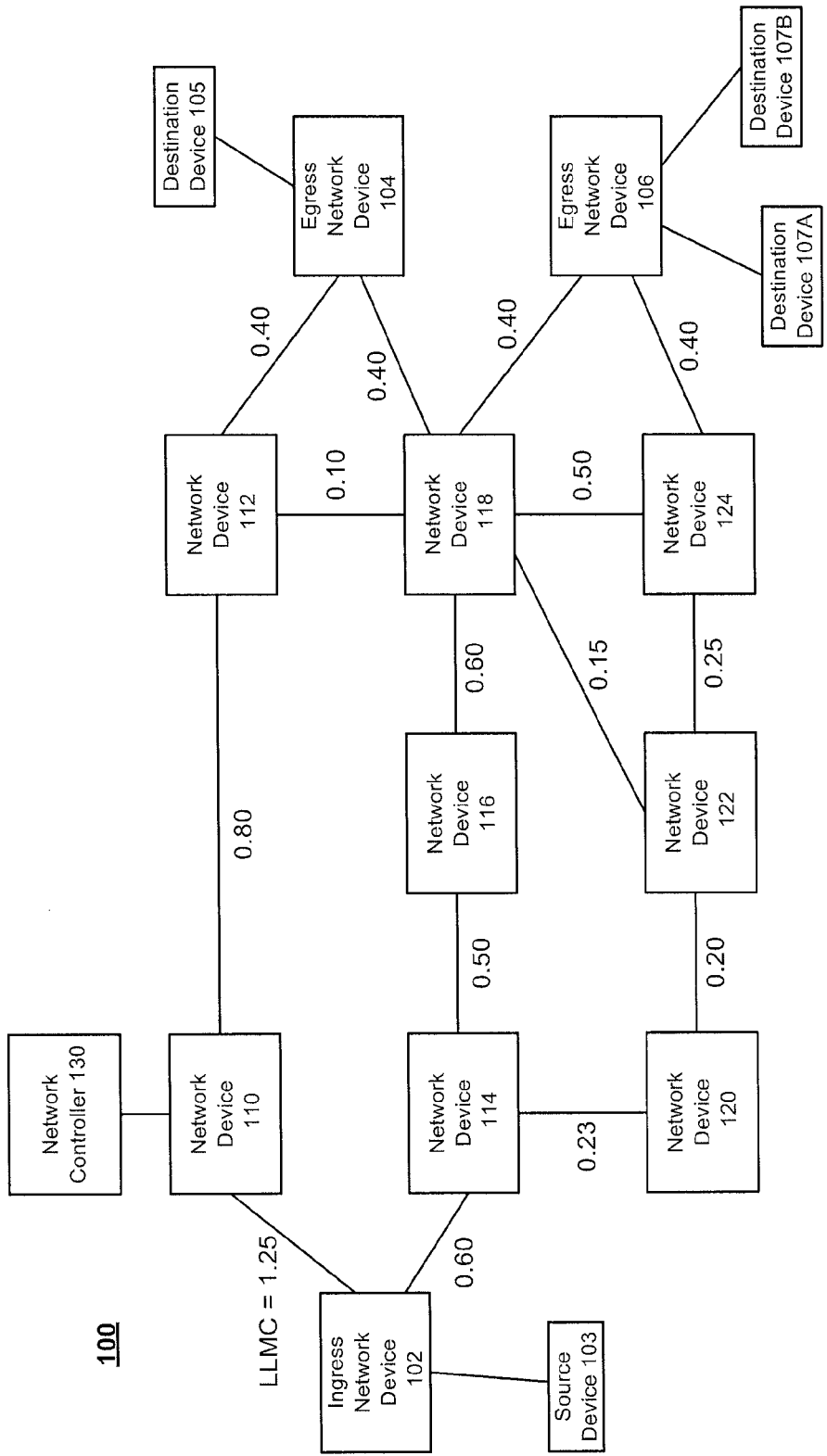
FIG. 1 is a diagram of an information handling system having link metrics used for multicast tree formation.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processors or processing resources such as a central processing unit (CPU) or hardware or software control logic, ROM, and/or other types of nonvolatile memory. Additional components of the information handling system may include one or more disk drives, one or more network interfaces for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, DVD-ROM, any other optical medium, RAM, PROM, EPROM, FLASH-EPROM, any other memory chip or cartridge, and/or any other medium from which a processor or computer is adapted to read.

FIG. 1 depicts an information handling system 100 such as may be used in or as part of a data center through which multicast traffic is sent. The information handling system 100 includes a plurality of core or intermediate network devices with edge devices serving to ingress and egress packets. As depicted, there is an ingress network device 102 coupled to a source device 103. For example, the ingress network device 102 may be a top-of-rack (TOR) device coupled to a plurality of servers on one side and to a plurality of intermediate network devices on the other. The ingress network device 102, and the other network devices of FIG. 1, may be a router, or a switch, or a combination thereof, or it may be a Layer 2 (L2) device, a Layer 3 (L3) device, or an L2/L3 device.

In the depicted embodiment, ingress network device 102 receives a multicast stream from the coupled source device 103, and the multicast stream is subscribed to by one or more destination devices behind each of an egress network device 104 and an egress network device 106. Destination device 105, 107A, and 107B are depicted in FIG. 1. As depicted, ingress network device 102 and the egress network devices 104 and 106 by the plurality of intermediate network devices, including intermediate network devices 110, 112, 114, 116, 118, 120, 122, and 124. The multicast stream is sent from the source device 103 to ingress network device 102 through several of the intermediate network devices, to both of egress network devices 104 and 106, and finally to the destination devices 105, 107A, and 107B. The path of the multicast stream is referred to as the multicast tree, or a point-to-multipoint (P2MP) path.

At some point, the multicast stream is replicated for delivery to both the egress network devices 104 and 106. This point is referred to as the replication point. In the embodiment of information handling system 100 depicted in FIG. 1, there are only two egress network devices. In other embodiments, there may be many more such egress network devices. In such embodiments, the multicast tree may include more than one replication point. The position of the replication points in a multicast tree, as well as the links from one network device to another, largely effect the performance of information handling system 100 in transmitting the multicast stream. Some important factors that may be considered in determining which links to send multicast traffic on and which network devices to use as replication points include a current or a time-averaged link load level, or link utilization, a number of hops in a potential path, and a an available multicast replication capacity. The multicast replication capacity may be determined by querying the application specific integrated circuit (ASIC) or ASICs on each network device provided for multicast replication. In some embodiments, a user may determine a maximum multicast replication capacity from a datasheet produced by the vendor of a given network device, and then input that value.

In information handling system 100, the link load level and the multicast replication capacity of each link, generally defined in terms of the terminating device of a given link, and communicated to a network controller 130. As illustrated, the network controller is coupled directly to network device 110. In general, the network controller is coupled to all the network devices in information handling system 100 and is able to receive information and sent information to each of the network devices. The network controller 130 has a topology of the network stored in memory. By receiving information regarding the join requests transmitted through the network devices, network controller 130 is aware of which network devices are egress network devices for a given multicast tree. For example, the network control 130 may receive information that Internet Group Management Protocol (IGMP) join messages have been received on egress network devices 104 and 106, and that those two network devices should be included in a multicast tree for the requested multicast stream as egress network devices.

The network control 130 may perform or benefit from IGMP snooping conducted within the information handling system 100. In some embodiments, network controller 130 is an OpenFlow controller and is able to receive information from and provide instructions to a network agent, in this case an OpenFlow agent, running on each of the network devices in information handling system 100. Thus in such embodiments, ingress network device 102, egress network devices 104 and 106, and the intermediate ingress devices 110, 112, 114, 116, 118, 120, 122, and 124 each have an OpenFlow agent running thereon.

After receiving the link load level and multicast replication capacity of each link, network controller 130 generates a metric for each link. In the depicted embodiment, this metric is based on the link load level and the multicast replication capacity. In particular, the metric for each link may be a ratio of the link load level to the multicast replication capacity. In computing the ratio, the link load level may be normalized to a value between zero and one, or expressed as a percentage and then divided by the available multicast replication capacity, i.e. the unused portion of the maximum multicast replication capacity, or by the maximum multicast replication capacity itself. This ratio may be referred to herein as the LLMC ratio. In general, a lower link load level and a higher multicast replication capacity are desirable as part of a multicast tree. A link with a lower ratio is better able to carry multicast traffic and better able to replicate multicast traffic. The LLMC ratio is computed such that all of the ingress linecards on a given network device through which the multicast traffic flows to an egress linecard on the network device are considered by network controller 130 as having the same LLMC ratio. FIG. 1 includes exemplary LLMC ratios for each of the plurality of links in information handling system 100. As depicted the link from intermediate device 122 to 118 has an LLMC equal to 0.15, while the LLMC of the link from network device 110 to 112 is 0.80. Setting other considerations aside for simplified explanation, the LLMC of the link to intermediate network device 118 would make it preferable for inclusion in a multicast tree over the link to network device 112.

Figure 2:
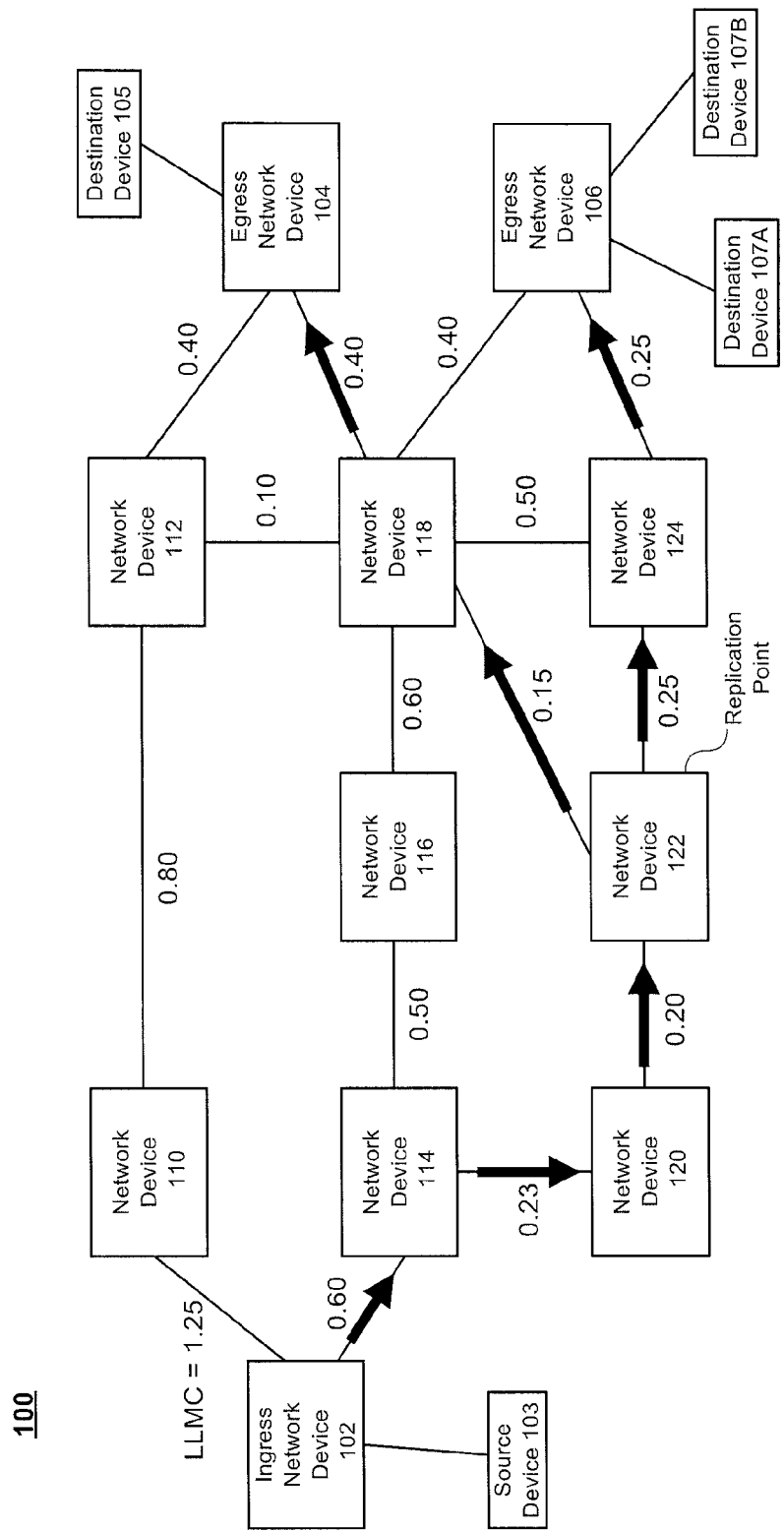
FIG. 2 is a diagram of an information handling system with a multicast tree formed and implemented according to an embodiment.

FIG. 2 depicts information handling system 100 with a computed multicast tree indicated by the solid-line arrows. Network controller 130 uses many pieces of information in the formation of the multicast tree. For instance, the IGMP join information received by network controller 130 indicates that the multicast tree ends on egress network device 104. These also register information from the source to a rendezvous point indicating that the multicast tree starts on ingress network device 102. Using the computed LLMC values for each link between the start and the ends of the multicast tree, network controller 102 generally minimizes the total sum of LLMCs encountered in the multicast path. In some embodiments, a time-averaged LLMC value may be used for each link in order to smooth quick variations of the LLMC ratio on a given link. The multicast tree is as depicted with the intermediate network device 122 serving as the replication point of the tree.

After network controller 130 computes the multicast tree, the multicast tree is implemented into information handling system 100. In the depicted embodiment, ingress network device 102, egress network devices 104 and 106, and all of the intermediate network devices 110, 112, 114, 116, 118, 120, 122, and 124 form a multiprotocol label switching (MPLS) network. In such an embodiment, the ingress network device 102 and the egress network devices 104 and 106 are label edge routers (LERs), while the intermediate network devices are label switch routers (LSRs).

Generally, the labels used to implement a multicast tree such as that depicted in FIG. 2 are distributed by the MPLS control plane through the Label Distribution Protocol (LDP). Such may be the case in some embodiments of information handling system 100, however in the depicted embodiment the MPLS control plane and LDP are not used. Additionally, Protocol Independent Multicast (PIM) joins are not used. Instead, network controller 130 is an OpenFlow controller and communicates the labels necessary to implement the multicast tree the multicast tree through the information handling system 100 to OpenFlow agents running on each of the network devices. In this sense, the network devices of information handling system 100 are hybrid devices, using a centralized, software-defined network controller alongside legacy protocols. The network is an MPLS network without a need for the MPLS control plane. This may simplify the implementation and maintenance of multicast trees through information handling system 100. However, further simplification of the formation of multicast trees is still possible. In some embodiments of information handling system 100, multiple multicast trees are present beginning on multiple sources or a single source. In general as many trees can be formed in information handling system as there are requested multicast streams.

Figure 3:
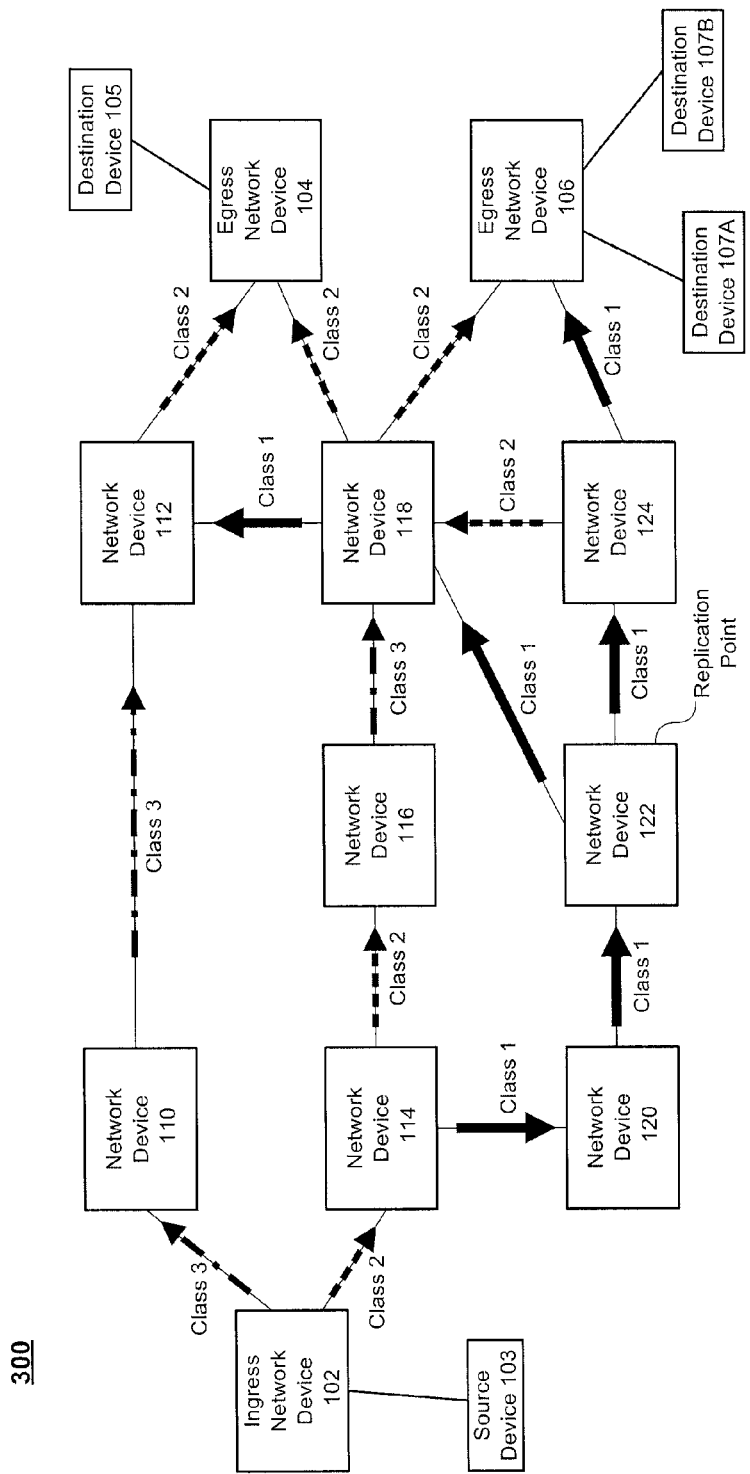
FIG. 3 is a diagram of an information handling system using class-based multicast tree formation according to an embodiment.

FIG. 3 depicts information handling system 100 with each of its plurality of links having an associated class. In some embodiments, a constrained shortest path first (CSPF) calculation is used to simplify the construction of the multicast tree, saving time in the process. Network controller 130 uses a number of cut-off points by which to categorize each link into classes. Though various embodiments include more or fewer classes, as depicted in FIG. 3 there are three classes used by network controller 130. Class 1, depicted in solid-line arrows, includes links having LLMC up to 0.25. Class 2, which is depicted in dashed-line arrows, includes links having an LLMC more than 0.25 and up to 0.50. Finally, class 3 includes links having an LLMC of more than 0.50 and is depicted in dash-dotted lines. Using classes of LLMC ratios may be simpler than using LLMC ratios directly as ordinary fluctuations in the LLMC ratio of a given link may be largely ignored.

After simplifying the LLMC values of each link into a class, network controller checks to see if a multicast path exists between the ingress network device 102 and egress network devices 104 and 106 in which all the links are categorized as class 1 links. In this instance, a full multicast path is not present. However, network controller 130 identifies the partial path from intermediate network device 114 to intermediate network devices 118 and 124 that includes only class 1 links. Additionally, the network controller 130 may identify the class 1 partial path from network device 114 to egress network device 106. After identifying the partial path, network controller 130 checks for class 2 links that, when added, complete the multicast tree from its start to its ends. In this example, network controller 130 identifies the class 2 link from ingress network device 102 to intermediate network device 114 and adds this to partial path. Similarly, but on the opposite end of the partial path, network control 130 may identify and add the class two link between intermediate network device 118 and the egress network device 104. If no satisfactory class 1 plus class 2 multicast tree can be constructed, class 3 links are then be investigated. By beginning with the class-based partial path and then incrementally adding links of less desirable classes, multicast tree formation may be performed with less computation.

Figure 4:
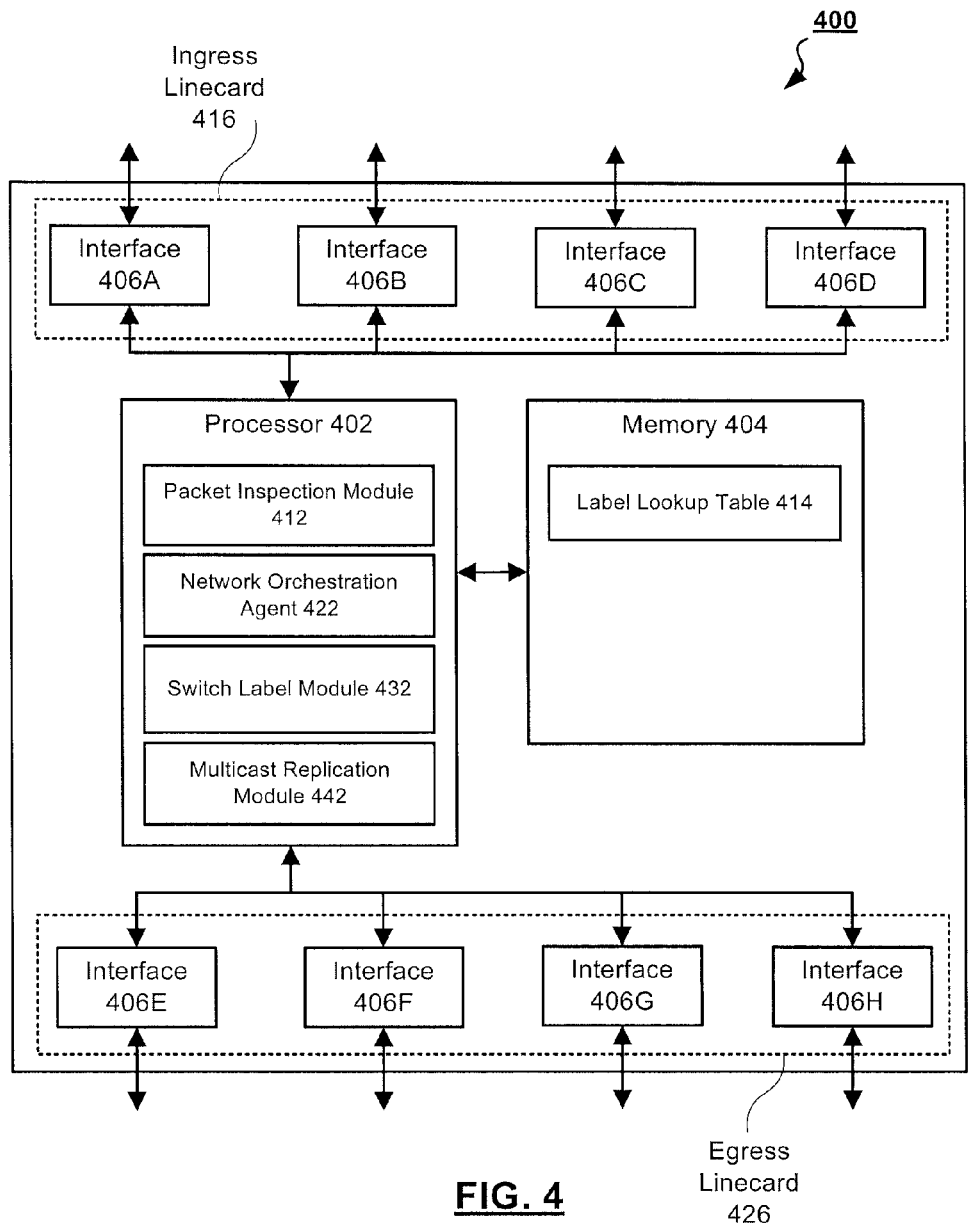
FIG. 4 is a diagram of an information handling device that serves as a customer edge device according to an embodiment.

FIG. 4 is a functional diagram of a network device 400, such as may be used for the network devices of information handling system 100 of FIGS. 1, 2, and 3. Network device 400, includes one or more processors, like exemplary processor 402. In some embodiments, processor 402 may include network processing units and/or central processing units. By execution of programmed instructions stored in memory 404, or by implementation as application specific integrated circuits (ASICs), processor 402 provides a plurality of modules. The modules are used in the inspection, replication, labeling, directing, forwarding, and extracting of information from data packets and control packets received on a plurality of interfaces or physical ports. Eight such interfaces are depicted, including interfaces 406A, 406B, 406C, 406D, 406E, 406F, 406G, and 406H.

As depicted, processor 402 provides a packet inspection module 404 that may be used to extract information from a received packet, such as destination and source addresses contained in the header of the packet or labels used in label switching. When an IGMP join message is received by network device 400, the packet inspection module 404 may determine the source of the packet and the destination of the multicast group being requested. Some embodiments of the packet inspection module 404 may be configured to perform deep packet inspection.

Once this information is extracted, a network orchestration agent 422 provided by network device 400 may send it to a coupled network controller, such as network controller 130 of FIGS. 1, 2, and 3. In addition to relaying information to network controller 130, network orchestration agent 422 receives information through one or more of interfaces 406A-H. This information may include labels, rules for the application of labels, and queries for information regarding the performance, status, and/or current configuration of network device 400. Some of the labels and rules for applying labels received by the network orchestration agent 422 implement one or more multicast trees as discussed above.

In some embodiments, packet inspection module 412 may pop off a label and deliver it to a switch label module 432. Depending on the use of network device 400 as a label switch routers (LSRs) or as a label switch router (LER), switch label module 432 may perform various functions. Where network device 400 is an LER, switch label module may be configured to add or "push" labels onto a packet and/or to remove or "pop" labels off a packet. As an example in which network device 400 is an LSR and a replication point in a multicast tree, after a label is read or processed by packet inspection module 412, switch label module 432 may perform a lookup in a label lookup table 414 stored in memory 404. The packet is replicated and sent out on multiple interfaces as indicated by the label in the lookup table 414.

In various embodiments, memory 404 may be a plurality of individual memory modules and types of memory. For example, memory 404 may include ROM, RAM, CAM, and/or other types of memory. In some embodiments, the label lookup may occur in a switch fabric of network device 400. Thus, switch label module 432 is configured to use the labels on packets to transmit them appropriate through a network according to the results of a lookup in label lookup table 414.

Processor 402 is also depicted as providing a multicast replication module 442. In the example in which network device 400 is an LSR and a replication point in the multicast tree, multicast replication module 442 performs the replication of the multicast stream received on one of interfaces 406A-406B, labeled as part of an ingress linecard 416, to more than one of the interfaces 406E-H, labeled as part of an egress linecard 426. For example, a multicast stream is received on interface 406A, the multicast stream is replicated by multicast replication module 442 to make two copies, one of which is sent out on interface 406E and the other is sent out on interface 406G. In some embodiments, multicast replication module 422 may make more than two copies.

The multicast replication module 442 also plays a significant role in the formation of multicast trees by providing the multicast replication capacity value used in computation of the LLMC ratio as discussed above. A query may be received by the multicast replication module 442 from the network orchestration agent 422 on behalf of a coupled network controller. The query may be for a value of the multicast replication capacity. In some embodiments, response to the query is a current multicast replication capacity, reflecting the multicast replication capacity of multicast replication module 442 at a specific time. In other embodiments, the response to the query is a time-averaged multicast replication capacity, reflecting the capacity of module 442 over a given time. Such data may be stored in memory 404 as well. In some instances, the response is a hardware specific multicast replication capacity value providing an absolute picture of the total multicast replication capacity of the multicast replication module 442. In some embodiments, all of this information may be obtained from multicast replication module 442 and then transmitted by network orchestration agent 422 to the coupled network controller for use in forming one or more multicast trees through an information handling system.

As discussed, one or more of the modules depicted as being provided by processor 402 may be provided in various configurations. For example, in one embodiment, the depicted modules are provided by software running on processor 402, in another, each module is an ASIC, and in yet another, each module is a combination of hardware and software.

Figure 5:
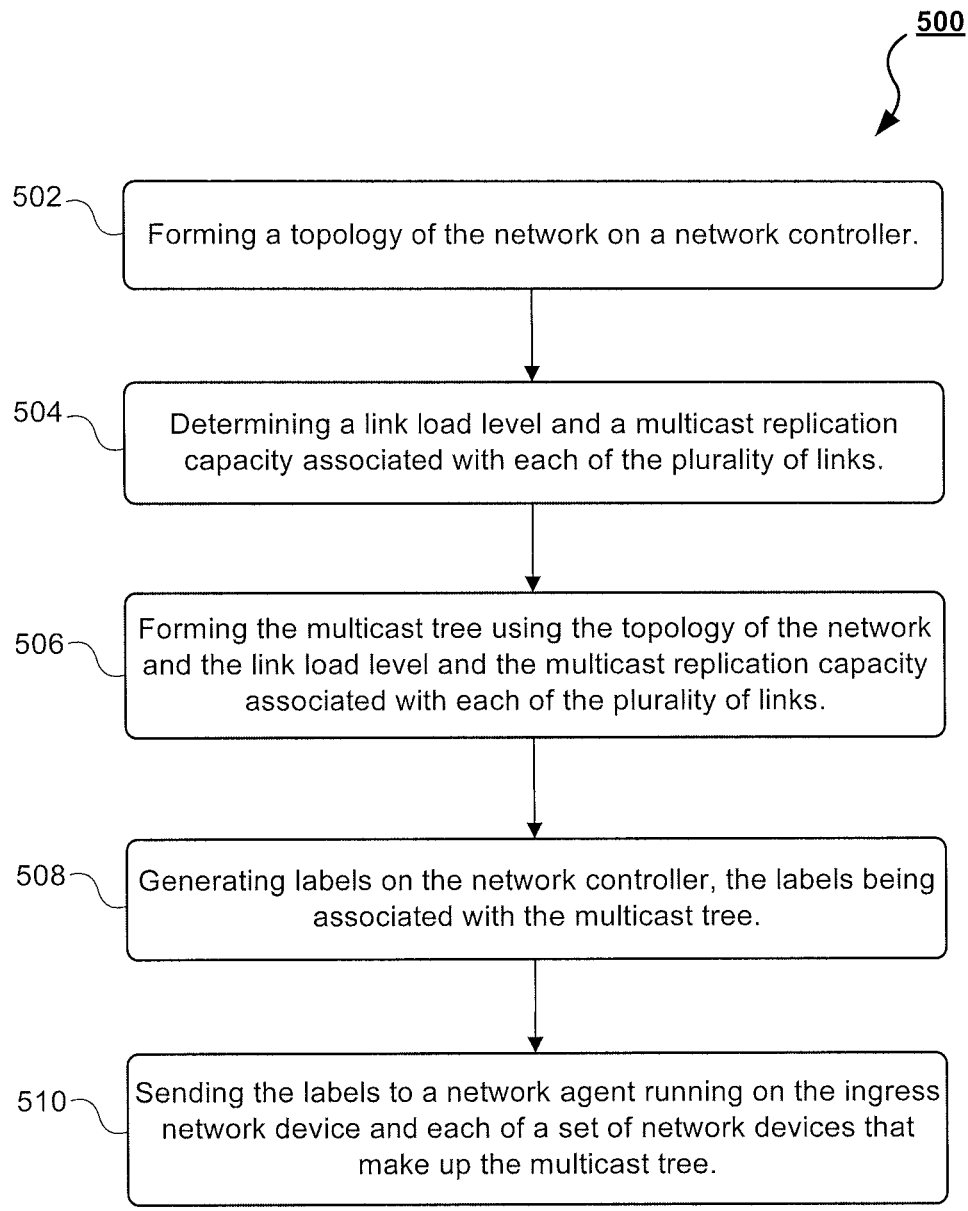
FIG. 5 is a flowchart of a method for providing a multicast stream transmitted from a provider edge device to a customer edge device.

FIG. 5 is a flowchart of a method 500 for forming a multicast tree for delivering a multicast stream from an ingress network device to a plurality of egress network devices in a network having a plurality of links. As depicted, method 500 includes a plurality of steps. Various embodiments of method 400 may include additional steps, not described herein, before, after, and in between the depicted steps. Method 500 begins in step 502 in which a network controller forms a topology of a network. The network may be a data center that includes a plurality of network devices such as LSRs and LERs coupled by the plurality of links. In step 504, a link load level and a multicast replication capacity are determined for each of the plurality of links. The topology and link load levels and multicast replication capacities are used by the network controller to form the multicast tree, in step 506. The multicast tree is then implemented in the plurality of network devices. This is done is step 508, in which the network controller generates labels associated with the multicast tree. In step 510, the network controller sends the labels to a network orchestration agent running on the devices that make up the multicast tree.

In order to better understand method 500, an example of one of many embodiments of method 500 is provided by way of reference to information handling system 100 of FIGS. 1, 2, and 3 and to aspects of network device 400 of FIG. 4. Network orchestration agents running on the network devices communicate topology information to network controller 130, which then forms a topology of the information handling system (step 502).

Other important information is gathered by network orchestration agents and sent to network controller 130. Egress network devices 104 and 106 both receive one or more IGMP joins from coupled destination devices 105, 107A, and 107B requesting to receive a multicast stream from a source device 103 behind ingress network device 102. A network orchestration agent, like network orchestration agent 422 of network device 400, running on each of egress network devices 104 and 106 communicates information of the join messages to network controller 130. With the information from the IGMP joins the network controller 130 is made aware of the start and ends of the multicast tree to be formed. Additionally, the network orchestration agents gather link load level information for links in the network and gather multicast replication capacities associated with those links (step 504).

Network controller 130 uses the link load levels and the multicast replication capacities to compute a metric for each link. The metric may be a ratio of link load level to multicast replication capacity. Using the topology information, the ingress and egress locations, and the ratios, network controller 130 computes a multicast tree that favors network devices with relatively low link load levels and relatively high multicast replication capacities (step 506). Network controller 130 generates a plurality of labels used for switching the packets through the multicast tree and distributes them to network agents running on the network devices that make up the multicast tree (steps 508 and 510). According to the multicast tree depicted in FIG. 2, network devices 102, 114, 120, 122, 118, and 124 all may receive labels associated with the multicast tree.

In some embodiments of method 500, the network controller creates a plurality of classes and assigns each link to one of the plurality of classes according to its LLMC value. In such embodiments, when the network controller forms the multicast tree is uses the classes in construction of the tree rather than the full LLMC value.

During the operation of information handling system 100, new multicast trees may be formed, multicast trees are removed and altered, and traffic flowing over any given tree may change. In consequence, some embodiments of method 500 include steps for monitoring and altering existing multicast trees. For example, an embodiment of method 500 includes a step of monitoring the link load levels along an existing multicast tree. Network controller may set threshold levels for usage on a particular network device or along a particular path. When a threshold link load level, or a threshold combination of link load level and multicast replication capacity, is observed, the network controller may form an additional multicast tree, generate labels for the additional tree, and send the labels to network agents operating on the devices along the additional multicast tree and the threshold-exceeding tree. The labels divert the traffic, or a portion of the traffic, to the additional multicast tree and away from the threshold-exceeding tree.

Some embodiments of information handling system 100 as seen in FIGS. 1, 2, and 3 and network device 400 of FIG. 4 include tangible, non-transient, machine-readable media that include executable code that when run by a processor, such as processor 402 of network device 400 in FIG. 4, may cause the processor to perform the steps of method 500 as described above. Some common forms of machine-readable media that may include the steps of method 500 are, for example, floppy disk, flexible disk, hard disk, magnetic tape, any other magnetic medium, CD-ROM, DVD-ROM, any other optical medium, punch cards, paper tape, any other physical medium with patterns of holes, RAM, PROM, EPROM, FLASH-EPROM, any other solid-state memory chip or cartridge, and/or any other medium from which a processor or computer is adapted to read. The machine-readable media may be memory 404 of FIG. 4.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A network device comprising:
    one or more processors;
    a network agent running on the one or more processors;
    a plurality of interfaces in communication with the one or more processors; and
    a memory, the memory storing instructions that, when executed by the one or more processors, cause a switch to perform a method comprising:
    sending a multicast replication capacity value to a network controller;
    receiving labels from the network controller, the labels corresponding to a label-switched multicast tree; and
    directing packets according to the label-switched multicast tree when sending packets on the plurality of interfaces; and
    replicating a multicast stream for transmission on at least two of the plurality of interfaces when the network device is designated as a replication point in the label-switched multicast tree.

2. The network device of claim 1, further comprising querying a multicast replication application specific integrated circuit (ASIC) to determine the multicast replication capacity value.

3. The network device of claim 1, wherein the network agent is an OpenFlow agent in communication with the network controller, the network controller being an OpenFlow controller.

4. The network device of claim 1, wherein the labels are created based on a ratio of a link load value of a link to the network device and the multicast replication capacity value.

5. The network device of claim 1, wherein the network agent is configured to transmit information about join messages received by the network device to the network controller.

6. A method for forming a multicast tree for delivering a multicast stream from an ingress network device to a plurality of egress network devices in a network having a plurality of links, the method comprising:
    forming a topology of the network on a network controller;
    determining a link load level and a multicast replication capacity associated with each of the plurality of links;
    forming the multicast tree using the topology of the network and the link load level and the multicast replication capacity associated with each of the plurality of links;
    generating labels on the network controller, the labels being associated with the multicast tree; and
    sending the labels to a network agent running on the ingress network device and each of a set of network devices that make up the multicast tree.

7. The method of claim 6, wherein forming the multicast tree using the topology of the network and the link load and the multicast replication capacity associated with each of the plurality of links comprises computing a ratio of the link load level to the multicast replication capacity for each link.

8. The method of claim 7, further comprising:
    creating a plurality of classes according to the ratio computed for each link; and
    assigning each of the plurality of links to a class, and wherein forming the multicast tree using the topology of the network and a link load level and a multicast replication capacity associated with each of the plurality of links further comprises using the class assigned to each of the plurality of links.

9. The method of claim 6, wherein the network controller is an OpenFlow network controller and the network agents running on the ingress network device and each of the set of network devices are OpenFlow agents.

10. The method of claim 6, further comprising:
    monitoring the link load levels along the multicast tree;
    forming an additional multicast tree when a threshold link load level is reached; and
    sending the labels associated with the additional multicast tree to the network agents to divert traffic from the multicast tree to the additional multicast tree.

11. The method of claim 6, further comprising receiving a plurality of join messages from a plurality of destination devices requesting the multicast stream.

12. The method of claim 6, wherein determining a link load and a multicast replication capacity associated with each of the plurality of links further comprises querying an application specific integrated circuit at a receiving end of each of the plurality of links to receiving a multicast replication capacity value.

* * * * *